US010428822B1

(12) United States Patent
Wang et al.

(10) Patent No.: US 10,428,822 B1
(45) Date of Patent: Oct. 1, 2019

(54) BETWEEN-BEARING MAGNETIC COUPLING

(71) Applicant: Upwing Energy, LLC, Cerritos, CA (US)

(72) Inventors: Zhiyang Wang, Irvine, CA (US); Patrick McMullen, Villa Park, CA (US); David Biddick, Houston, TX (US)

(73) Assignee: Upwing Energym LLC, Cerritos, CA (US)

( * ) Notice: Subject to any disclaimer, the term of this patent is extended or adjusted under 35 U.S.C. 154(b) by 0 days.

(21) Appl. No.: 15/965,716

(22) Filed: Apr. 27, 2018

(51) Int. Cl.
*F04D 13/02* (2006.01)
*F04D 13/08* (2006.01)
*H02K 49/10* (2006.01)
*F04D 13/06* (2006.01)
*F04D 13/10* (2006.01)
*E21B 43/12* (2006.01)

(52) U.S. Cl.
CPC ........ *F04D 13/026* (2013.01); *F04D 13/0606* (2013.01); *E21B 43/128* (2013.01); *F04D 13/0633* (2013.01); *F04D 13/08* (2013.01); *F04D 13/10* (2013.01); *H02K 49/106* (2013.01)

(58) Field of Classification Search
CPC ............ H02K 7/003; H02K 7/09; H02K 5/12; H02K 5/128; H02K 5/132; H02K 5/1285; H02K 49/102; H02K 49/104; H02K 49/106; H02K 49/108; F04D 13/0626; F04D 13/0606; F04D 13/06; F04D 13/08
USPC .................................... 310/87, 90.5, 103, 90
See application file for complete search history.

(56) References Cited

U.S. PATENT DOCUMENTS 3,056,634 A * 10/1962 Woollenweber, Jr. ....................... F01D 25/166 384/287
3,936,683 A * 2/1976 Walker ................... H02K 49/06 310/103
4,080,112 A * 3/1978 Zimmermann ......... F04D 1/006 415/104

(Continued)

FOREIGN PATENT DOCUMENTS

DE 4214848 A1 * 11/1993 ............. H02K 49/10
JP 62213543 A * 9/1987

OTHER PUBLICATIONS

English Machine Translation, Matsuda JPS62213543 (Year: 1987).*
https://www.ggbearings.com/en/faq/what-are-cylindrical-bearings-and-how-are-they-used (Year: Accessed 2019).*

*Primary Examiner* — Burton S Mullins
(74) *Attorney, Agent, or Firm* — Fish & Richardson P.C.

(57) ABSTRACT

An outer barrel is configured to rotate. A first central shaft passes through the outer barrel. The first central shaft is configured to rotate with the outer barrel. A first bearing assembly is attached to the first shaft on a first side of the outer barrel. A second bearing assembly is attached to the first shaft on a second side of the barrel. The second bearing assembly supports the first shaft to an isolation can. An inner barrel is magnetically coupled to and is configured to rotate with the outer barrel. A second central shaft passes through the inner barrel. The second central shaft is configured to rotate with the inner barrel. A third bearing assembly is attached to the second shaft. The isolation can fluidically isolates the inner barrel assembly from the outer barrel assembly. The isolation can supports the second bearing assembly to the housing.

29 Claims, 5 Drawing Sheets

(56) References Cited

U.S. PATENT DOCUMENTS

| | | | | |
|---|---|---|---|---|
| 4,539,498 | A * | 9/1985 | Wilkes | H02K 7/11 310/104 |
| 4,732,225 | A * | 3/1988 | Jurgens | E21B 4/00 166/66.5 |
| 4,850,818 | A * | 7/1989 | Kotera | F04D 29/0413 417/366 |
| 5,229,676 | A * | 7/1993 | Bood | F16C 19/52 310/114 |
| 5,783,885 | A * | 7/1998 | Post | F16C 39/063 310/103 |
| 6,164,833 | A * | 12/2000 | Kai | F16C 19/54 384/518 |
| 6,293,773 | B1 * | 9/2001 | Doberstein | H02K 49/106 417/420 |
| 6,703,740 | B2 * | 3/2004 | Klode | H02K 1/278 310/114 |
| 6,863,124 | B2 * | 3/2005 | Araux | E21B 43/128 166/105 |
| 7,677,041 | B2 * | 3/2010 | Woollenweber | F01D 25/16 384/452 |
| 9,362,812 | B2 * | 6/2016 | Osterberg | H02K 49/106 |
| 9,932,817 | B1 * | 4/2018 | Kusmer | E21B 47/011 |
| 10,036,389 | B2 * | 7/2018 | Li | F04D 13/10 |
| 2015/0114632 | A1 * | 4/2015 | Romer | E21B 4/003 166/250.15 |
| 2016/0168964 | A1 * | 6/2016 | Li | F04D 13/10 417/420 |
| 2016/0333677 | A1 * | 11/2016 | Westberg | E21B 43/128 |

\* cited by examiner

BETWEEN-BEARING MAGNETIC COUPLING

TECHNICAL FIELD

This disclosure relates to magnetic couplings in rotating machines.

BACKGROUND

Rotating equipment is sometimes used in hazardous environments, such as a downhole environment in oil and gas wells, which is very hostile to equipment. The downhole pressures and temperatures are usually higher than the ambient conditions. The downhole fluids can contain very corrosive species like $H_2S$ and $CO_2$. In addition, there can be sand, debris, and other solids in the wellbore. The usable life of the equipment exposed to the downhole environment is often much shorter due to different failure modes caused by combining these conditions in different ways. High temperature, high strength, and corrosion-resistant materials are used to extend the life of downhole equipment in many cases. However, the presence of debris and solids can still be detrimental to downhole rotary devices at the physical contact points, for example bearing surfaces. Therefore, it is a common practice to protect the contact surfaces of the downhole rotary devices by isolating the downhole environment.

Rotary devices have a shaft to transmit torque. The traditional approach to transmit torque is to use a solid shaft with shaft seals around it to isolate downhole fluids from the motor, bearings, and other parts which need to be protected from downhole fluids and solids. Seals eventually fail, especially under the pressure, temperature, and corrosive downhole environments. Failure of seals leads to the ingress and exposure to downhole fluids for parts that cannot tolerate the downhole fluids. This eventually causes different failure modes of downhole rotating devices. To fundamentally eliminate all these failure modes, the shaft seal can be eliminated. To do so, a magnetic coupling can be used to transmit torques without a solid or mechanically linked shaft, instead using a magnetic field to transmit torque. When there are no shaft seals, there are no shaft seal failures.

SUMMARY

This disclosure describes technologies relating to isolating rotating machines which can be used to power, for example, an electric submersible pump, compressor, or generator.

An example implementation of the subject matter described within this disclosure is a magnetic coupling assembly with the following features. An outer barrel assembly includes an outer barrel that is configured to rotate. A first central shaft passes through a first central longitudinal axis of the outer barrel. The first central shaft is configured to rotate with the outer barrel. A first bearing assembly is attached to the first shaft on a first side of the outer barrel. The first bearing assembly supports the first shaft to a housing. A second bearing assembly is attached to the first shaft on a second side of the outer barrel opposite the first side of the outer barrel. The second bearing assembly supports the first shaft to an isolation can. An inner barrel assembly includes an inner barrel that is magnetically coupled to the outer barrel. The inner barrel is configured to rotate with the outer barrel. A second central shaft, separate from the first central shaft, passes through a second central longitudinal axis of the inner barrel. The second central shaft is configured to rotate with the inner barrel. The first central axis and the second central axis are aligned. A third bearing assembly is attached to the second shaft on a first side of the inner barrel. The third bearing assembly supports the second shaft to the housing. The isolation can fluidically isolates the inner barrel assembly from the outer barrel assembly. The isolation can supports the second bearing assembly to the housing.

Aspects of the example implementation, which can be combined with the example implementation alone or in combination, include the following. The isolation can includes a surface that defines a first recess configured to receive and support the second bearing assembly. A surface defines a second recess separate and fluidically isolated from the first recess.

Aspects of the example implementation, which can be combined with the example implementation alone or in combination, include the following. A fourth bearing assembly is attached to the second shaft on a second side of the inner barrel opposite the first side of the inner barrel. The fourth bearing assembly supports the second shaft to the isolation can. The second recess is configured to receive and support the fourth bearing assembly.

Aspects of the example implementation, which can be combined with the example implementation alone or in combination, include the following. The isolation can is a first isolation can. The magnetic coupling assembly further includes a second isolation can that is configured to be received by the first isolation can. The second isolation can is configured to fluidically isolate the inner barrel assembly from an outside environment.

Aspects of the example implementation, which can be combined with the example implementation alone or in combination, include the following. A fourth bearing assembly is attached to a second end of the second shaft. The fourth bearing assembly supports the second shaft to the second isolation can.

Aspects of the example implementation, which can be combined with the example implementation alone or in combination, include the following. The outer barrel includes permanent magnets configured to magnetically couple the outer barrel to the inner barrel.

Aspects of the example implementation, which can be combined with the example implementation alone or in combination, include the following. The inner barrel includes permanent magnets configured to magnetically couple the inner barrel to the outer barrel.

Aspects of the example implementation, which can be combined with the example implementation alone or in combination, include the following. The first bearing assembly, the second bearing assembly, or the third bearing assembly include magnetic bearings.

An example implementation of the subject matter described within this disclosure is a method of transferring torque with the following features. A first barrel is rotated with a first rotating machine. A first shaft is supported with a first bearing assembly. The first shaft is attached to the first barrel. The first bearing assembly is on a first side of the first barrel. The first shaft of the first barrel is supported with a second bearing assembly that is separate from the first bearing assembly. The second bearing assembly is on a second side of the first barrel opposite the first side of the first barrel. The second bearing assembly is supported by an isolation can. A second barrel is rotated in response to rotating the first barrel. The second barrel is magnetically coupled to the first barrel. A second shaft is supported with a third bearing assembly. The second shaft is attached to the second barrel. The third bearing assembly is separate from the first and second bearing assembly. The third bearing assembly being on a first side of the second barrel.

Aspects of the example method, which can be combined with the example method alone or in part, include the following. The second shaft is supported with a fourth bearing assembly. The fourth bearing assembly is separate from the first bearing assembly, the second bearing assembly, and third bearing assembly. The fourth bearing assembly is on a second side of the second barrel opposite the first side. The fourth bearing assembly is supported by the isolation can. A second rotating machine is rotated by the second barrel.

Aspects of the example method, which can be combined with the example method alone or in part, include the following. The isolation can is a first isolation can. The second shaft is supported with a fourth bearing assembly. The fourth bearing assembly is separate from the first bearing assembly, the second bearing assembly, and third bearing assembly. The fourth bearing assembly is on a second side of the second barrel opposite the first side. The fourth bearing assembly is supported by a second isolation can. A second rotating machine is rotated by the second barrel.

Aspects of the example method, which can be combined with the example method alone or in part, include the following. The second rotating machine includes a pump, a compressor, or an electric generator.

Aspects of the example method, which can be combined with the example method alone or in part, include the following. The first barrel is fluidically isolated from the second barrel with the isolation can.

Aspects of the example method, which can be combined with the example method alone or in part, include the following. The first rotating machine includes an electric motor or a turbine.

Aspects of the example method, which can be combined with the example method alone or in part, include the following. Supporting the first barrel with a first bearing assembly includes magnetically supporting the first barrel.

Aspects of the example method, which can be combined with the example method alone or in part, include the following. Magnetically supporting the first barrel includes using permanent magnets to generate a magnetic field.

Aspects of the example method, which can be combined with the example method alone or in part, include the following. Supporting the second barrel with a second bearing assembly comprises magnetically supporting the second barrel.

Aspects of the example method, which can be combined with the example method alone or in part, include the following. Permanent magnets mounted on the first barrel or the second barrel magnetically couple the first barrel and second barrel to one another.

An example implementation of the subject matter described within this disclosure is a magnetic coupling assembly with the following features. An outer barrel assembly includes an outer barrel that is configured to rotate. A first central shaft passes through a first central longitudinal axis of the outer barrel. The first central shaft is configured to rotate with the outer barrel. A first bearing assembly is attached to the first shaft on a first side of the outer barrel. The first bearing assembly supports the first shaft to a housing. A second bearing assembly is attached to the first shaft on a second side of the barrel opposite the first side of the barrel. The second bearing assembly supports the first shaft to an isolation can. An inner barrel assembly includes an inner barrel magnetically coupled to the outer barrel. The inner barrel is configured to rotate with the outer barrel. A second central shaft, separate from the first central shaft, passes through a second central longitudinal axis of the inner barrel. The second central shaft is configured to rotate with the inner barrel. The first central axis and the second central axis are aligned. A third bearing assembly is attached to the second shaft on a first side of the inner barrel. The third bearing assembly supports the second shaft to the housing. A fourth bearing assembly is attached to the second shaft on a second side of the second barrel opposite the first side of the second barrel. The second bearing assembly supports the second shaft to the isolation can. The isolation can fluidically isolates the inner barrel assembly from the outer barrel assembly. The isolation can supports the second bearing assembly to the housing. The isolation can supports the fourth bearing assembly to the housing.

Aspects of the example implementation, which can be combined with the example implementation alone or in combination, include the following. The inner barrel assembly, outer barrel assembly, and isolation can are configured to operate within a wellbore.

Aspects of the example implementation, which can be combined with the example implementation alone or in combination, include the following. The inner barrel includes permanent magnets configured to magnetically couple the inner barrel to the outer barrel.

Aspects of the example implementation, which can be combined with the example implementation alone or in combination, include the following. The outer barrel includes permanent magnets configured to magnetically couple the outer barrel to the inner barrel.

Aspects of the example implementation, which can be combined with the example implementation alone or in combination, include the following. The third bearing assembly or the fourth bearing assembly comprises magnetic bearings.

Aspects of the example implementation, which can be combined with the example implementation alone or in combination, include the following. The first bearing assembly or the second bearing assembly includes magnetic bearings.

Aspects of the example implementation, which can be combined with the example implementation alone or in combination, include the following. The isolation can includes a surface that defines first recess configured to receive and support the second bearing assembly. A surface defines second recess separate and fluidically isolated from the first recess. The second recess is configured to receive and support the fourth bearing assembly.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In downhole applications where a rotating machine is placed within a wellbore, protectors are often used to protect bearings and other contact surfaces from a downhole environment. A protector uses face seals on a shaft to isolate downhole fluids from bearings and motors as mentioned above. To have a face seal work, the pressure on both sides of the face seal needs to be somewhat equalized. To do so, a pressure-equalizing design, like a rubber bag or a labyrinth chamber, is typically adopted. To include all of these features, the protector usually is long, expensive, complicated, and failure-prone. Therefore, eliminating the protector makes downhole rotary devices shorter, less expensive, simpler, and more reliable.

A magnetic coupling can be used to eliminate the protector. When a radial gap type magnetic coupling is used to transmit torque, a can is placed between the internal, or male, coupling rotor and the external, or female, coupling rotor to isolate downhole fluids from a motor unit or any other component which needs to be protected from the downhole environment. In this case, the "protectors", which are commonly used in the electrical submersible pumps, can be eliminated. By using a magnetic coupling with a sealing can we achieve the objective of complete elimination of protectors for downhole rotating devices.

Figure 1:
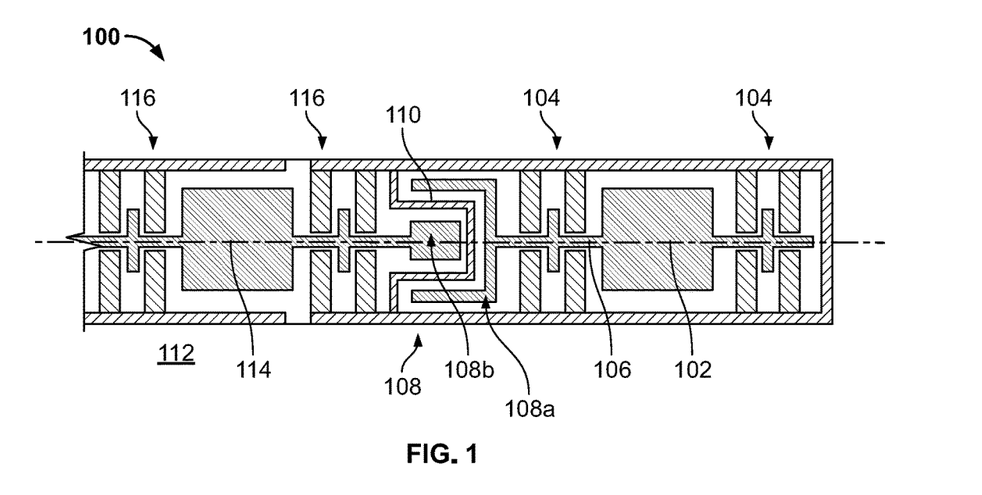
FIG. 1 is an example of an electric machine magnetically coupled to a rotating machine.

FIG. 1 shows an example of a rotating machine 100. The illustrated example includes a driver 102 supported by a set of driver bearings 104. The driver 102 can include an electric motor, gas turbine, diesel engine, or any other driver. A driver shaft 106 rotatably connects the driver 102 to the magnetic coupling 108. More specifically, a first end of the driver shaft 106 is attached to an outer barrel 108a of the magnetic coupling 108. The magnetic coupling 108 is configured to transmit torque without a physically contacting connection. Instead, the magnetic coupling 108 uses magnetic fields to couple two separate drive shafts, eliminating the need for physical contact. The inner barrel 108b and/or the outer barrel 108a can include permanent magnets and/or electro magnets. The attractive forces between the female barrel 108a and male barrel 108b allow both rotors to rotate together so that torque is transmitted to a driven rotating machine 114. The driver bearings 104 can include ball bearings, fluid film bearings, or any other type of mechanical bearing. The driver bearings 104 can include passive magnetic bearings, active magnetic bearings, or any combination of magnetic bearings. Both barrels rotate and can be referred to as rotors. A can 110 is used between a male, inner barrel 108b and the female, outer barrel 108a, to isolate the outer barrel 108a and inner barrel 108b from one another. In some instances, one of the rotors, such as the outer barrel 108a, can be fluidically isolated from an outside environment 112 while leaving the other rotor, such as the male barrel 108b, exposed to the outside environment. In some implementations, the outside environment 112 can include a downhole environment. The driven rotating machine 114 is supported by the driven bearings 116. In some implementations, the driven rotating machine 114 can include a pump, a compressor, or an electric generator. The driver bearings 116 can include ball bearings, fluid film bearings, or any other type of mechanical bearing. The driven bearings 116 can include passive magnetic bearings, active magnetic bearings, or any combination of magnetic bearings.

The space inside the can 110, that is, the space isolated from the outside environment 112, can be filled with insert gas at low pressure to protect, for example, a motor stator and rotor while minimizing the windage loss. In the case of an electric submersible pump, the space inside the can 110 may be filled with gas or a dielectric fluid to provide proper lubrication to the driver bearings 104. In such cases, even though the downhole pressure can be higher than the in-can ambient conditions, the motor is isolated from the downhole pressure and its performance is not affected and is very predictable. With such isolation, little to no debris can enter into the can 110, thus avoiding contact failures. In this case, the rotor inside the can is spinning at a high speed in a low loss, clean, and controlled environment so that the efficiency and reliability of the rotary device is much improved.

In the illustrated implementation, the inner barrel 108b and the outer barrel 108a are configured to rotate in an overhung arrangement, in which the rotors are placed outboard of the driven bearings 116 and the driver bearings 104, respectively. Overhung magnetic coupling arrangements have certain drawbacks. For example, to transmit enough torque from the driver 102 to the driven rotating machine 114, the size of the female barrel 108a and the male barrel 108b need to be sufficient. For example, as greater torque transmission is needed, the female barrel 108a and the male barrel 108b can be made with a greater length or with a greater radius as compared with lower torque applications. As certain applications limit available diameters, such as downhole applications, length is often increased to achieve greater torque transmission. High overhung weights of the female barrel 108a and male barrel 108b lower the frequencies of bending modes, thus lowering rotor-dynamic margins. Also, due to the bearing surface speed limits, the bearing diameter size can be limited. The limitations on the bearing diameter puts constraints on the diameter of the shaft connected to the magnetic coupling rotor. These constraints put an upper limit on the shaft stiffness to support the overhung female and male rotors. As the shaft stiffness decreases, the rotor-dynamic margins decrease as well. In other words, the system becomes less stable at high-speeds as the stiffness decreases.

This disclosure describes a magnetic coupling with a between-bearing arrangement to improve rotor-dynamic stability. A sealing can is placed between the female and male magnetic coupling barrels to fluidically isolate the barrels from one another. An outboard bearing of one of the barrels is structurally supported by the can. The portions of the female and male rotors which are overhung are reduced significantly with this arrangement. Therefore, the rotodynamic stability of both the rotors with motor and driven part are improved. The increased rotodynamic stability allows for greater axial barrel lengths to be used while maintaining rotodynamic stability. In some implementations, the diameter of the shaft between the motor and female rotor and the diameter of the shaft between the driven part and the male rotor can be thicker, and therefore stiffer. The stiffer shafts can offer improved rotor-dynamic margins. Improved rotor-dynamic margins can result in high speeds. For example, in some implementations, speeds may be as low as 10,000 rpm or as high as 120,000 rpm. While the coupled components have an optimal speed range at which they are most efficient, this does not prevent the combined system from running at less efficient speeds to achieve a desired performance characteristics.

Figure 2:
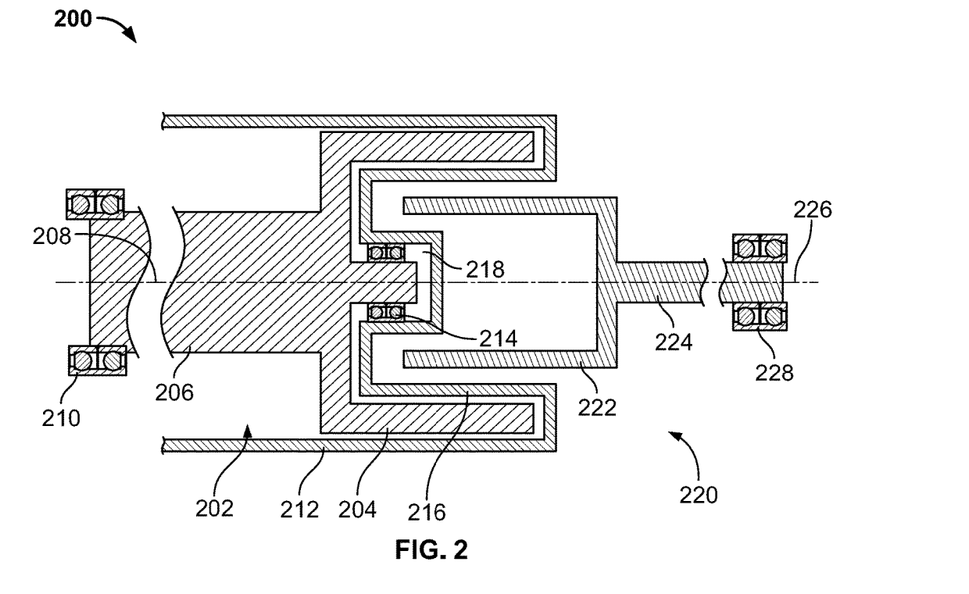
FIG. 2 is a side, half cross-sectional view of an example magnetic coupling.

FIG. 2 is a side cross-sectional view of an example magnetic coupling assembly 200 that can be used with aspects of this disclosure. The magnetic coupling assembly 200 includes an outer barrel assembly 202 with an outer barrel 204 configured to rotate. A first central shaft 206 passes through a first central longitudinal axis 208 of the outer barrel 204. The first central shaft 206 rotates in unison with the outer barrel 204. A first bearing assembly 210 is attached to the first shaft 206 on a first side of the outer barrel 204. In some implementations, the first bearing assembly 210 can be opposite a rotating machine, such as a motor or generator. The first bearing assembly 210 supports the first shaft to a housing 212. A second bearing assembly 214 is attached to the first shaft 206 on a second side of the barrel 204 opposite the first side of the barrel 204. The second bearing assembly 214 supports the first shaft 206 to the isolation can 216. The isolation can 216 includes a surface that defines a first recess 218 configured to receive and support the second bearing assembly 214. The recess 218 is configured to align with the first central longitudinal axis 208. In some implementations, the can 216 can include structural reinforcements around the recess 218 to help structurally support the rotodynamic loads caused by the rotating coupling 200. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor®, and carbon or glass reinforced Torlon® or PEEK®.

The magnetic coupling assembly 200 also includes an inner barrel assembly 220 with an inner barrel 222 magnetically coupled to the outer barrel 204. That is, the inner barrel 222 is configured to rotate with the outer barrel 204. A second central shaft 224, that is separate from the first central shaft 206, passes through a second central longitudinal axis 226 of the inner barrel 222. The second central shaft rotates with the inner barrel. The first central axis 208 and the second central axis 226 are aligned. A third bearing assembly 228 is attached to the second shaft 224 on a first side of the inner barrel 222. The third bearing assembly 228 supports the second shaft 224 to the housing 212. The isolation can 216 fluidically isolates the inner barrel assembly 220 from the outer barrel assembly 202.

Figure 3:
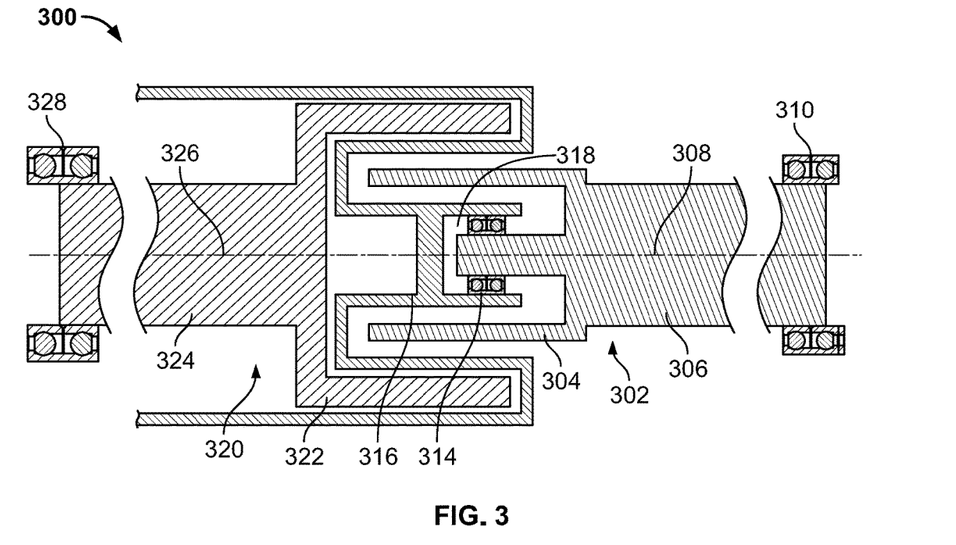
FIG. 3 is a side, half cross-sectional view of an example magnetic coupling.

FIG. 3 is a side cross-sectional view of an example magnetic coupling assembly 300 that can be used with aspects of this disclosure. The magnetic coupling assembly 300 includes an inner barrel assembly 302 with an inner barrel 304 configured to rotate. A first central shaft 306 passes through a first central longitudinal axis 308 of the inner barrel 304. The first central shaft 306 rotates in unison with the inner barrel 304. A first bearing assembly 310 is attached to the first shaft 306 on a first side of the inner barrel 304. In some implementations, the first bearing assembly 310 can be opposite a rotating machine, such as a motor or generator. The first bearing assembly 310 supports the first shaft 306 to a housing (not shown). A second bearing assembly 314 is attached to the first shaft 306 on a second side of the inner barrel 304 opposite the first side of the inner barrel 304. The second bearing assembly 314 supports the first shaft 306 to the isolation can 316. The isolation can 316 includes a surface that defines a first recess 318 configured to receive and support the second bearing assembly 314. The recess 318 is configured to align with the first central longitudinal axis 308. In some implementations, the can 316 can include structural reinforcements around the recess 318 to help structurally support the rotodynamic loads caused by the rotating coupling 300. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

The magnetic coupling assembly 300 also includes an outer barrel assembly 320 with an outer barrel 322 magnetically coupled to the inner barrel 304. That is, the inner barrel 304 is configured to rotate with the outer barrel 322. A second central shaft 324, that is separate from the first central shaft 306, passes through a second central longitudinal axis 326 of the outer barrel 322. The second central shaft 324 rotates with the outer barrel 322. The first central axis 308 and the second central axis 326 are aligned. A third bearing assembly 328 is attached to the second shaft 324 on a first side of the outer barrel 322. The isolation can 316 fluidically isolates the inner barrel assembly 302 from the outer barrel assembly 320.

Figure 4:
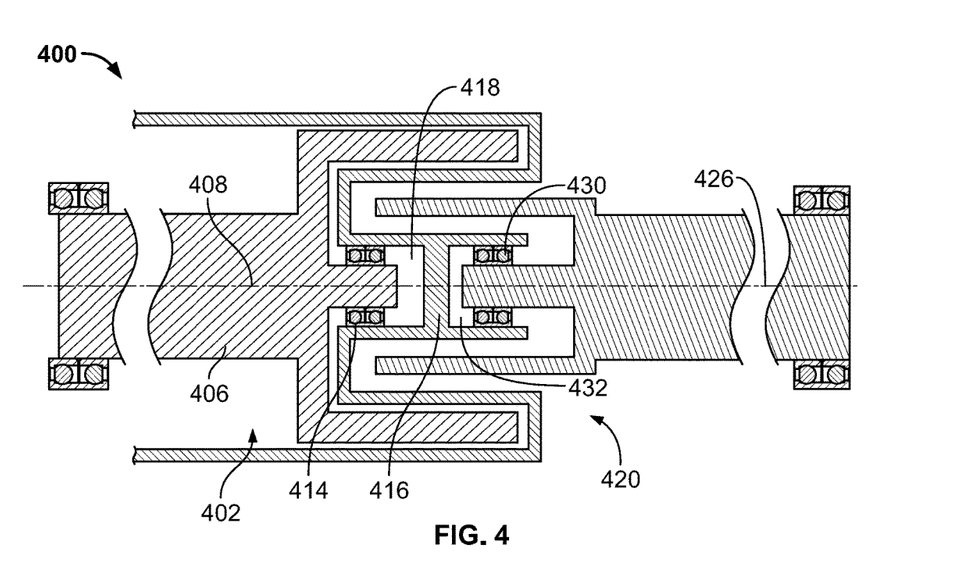
FIG. 4 is a side, half cross-sectional view of an example magnetic coupling.

FIG. 4 is a side cross-sectional view of an example magnetic coupling assembly 400 that can be used with aspects of this disclosure. In this example, both the inner barrel assembly 402 and the outer barrel assembly 420 include bearings, the outer barrel outboard bearing 414 and the inner barrel outboard bearing 430, supported by the can 416. In such an implementation, the outer barrel outboard bearing 414 is supported by a first recess 418 on a first side of the can 416, while the inner barrel outboard bearing 430 is supported by a second recess 432 on a second side of the can 416. The first recess 418 and the second recess 432 are fluidically isolated from one another. The first recess 418 is configured to align with the first central longitudinal axis 408. The second recess 432 is configured to align with the second central longitudinal axis 426. In some implementations, the can 416 can include structural reinforcements around the first recess 418 and/or the second recess 432 to help structurally support the rotodynamic loads caused by the rotating coupling 400. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 5:
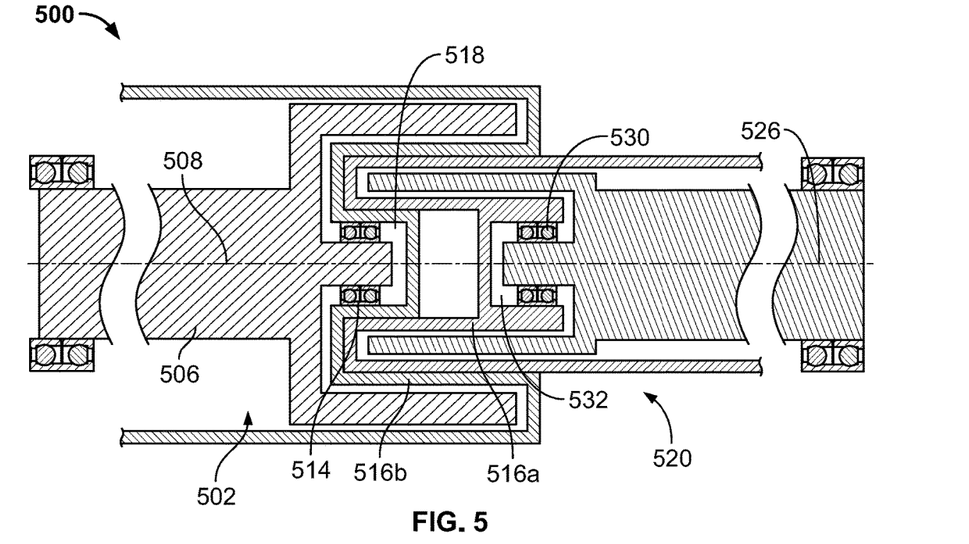
FIG. 5 is a side, half cross-sectional view of an example magnetic coupling.

FIG. 5 is a side cross-sectional view of an example magnetic coupling assembly 500 that can be used with aspects of this disclosure. In this example, both the inner barrel assembly 520 and the outer barrel assembly 502 have an inner can 516a and an outer can 516b. The separate cans allow for complete sealing of both rotating machines coupled to either barrel from the outside environment. In such an implementation, the outer barrel can 516b includes a first recess 518 configured to receive and support the outer barrel outboard bearing assembly 514, while the inner barrel can 516a is configured to receive and support the inner barrel outboard bearing 530. The first recess 518 is configured to align with the first central longitudinal axis 508. The second recess 532 is configured to align with the second central longitudinal axis 526. In some implementations, the can 516a can include structural reinforcements around the first recess 518. In some implementations, the can 516b can include structural reinforcements around the second recess 532 to help structurally support the rotodynamic loads caused by the rotating coupling 500. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 6:
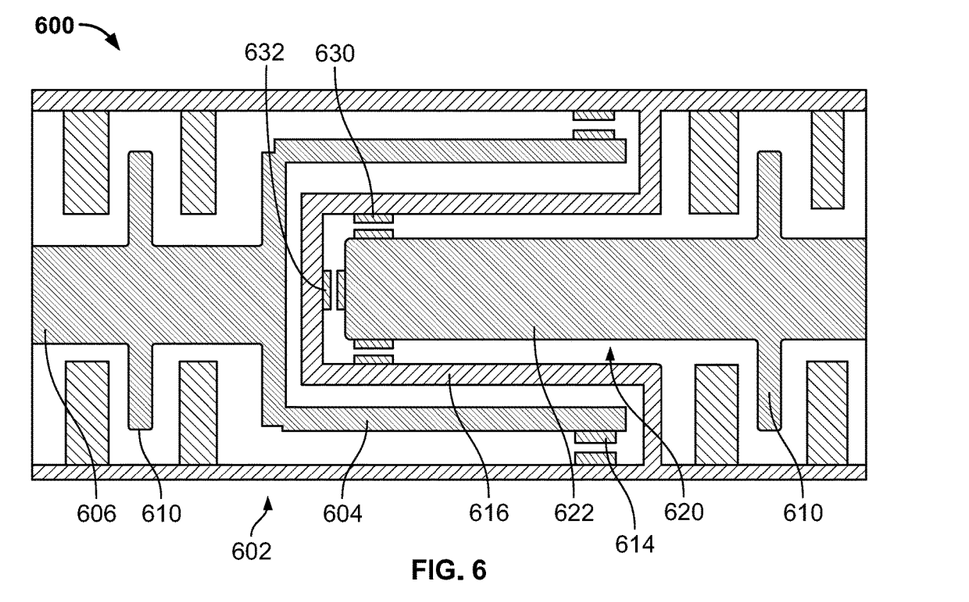
FIG. 6 is a side, half cross-sectional view of an example magnetic coupling.

FIG. 6 is a side cross-sectional view of an example magnetic coupling assembly 600 that can be used with aspects of this disclosure. In this example, the outer barrel assembly 602 and the inner barrel assembly 620 include additional bearings, the outer barrel outboard bearing 614 and the inner barrel outboard bearing 630, supported by the can 616. In this implementation, the can 616 does not include any specialized recess to support the bearings. Instead, larger radial bearings are added to the inner barrel 222 and the outer barrel 204. In this implementation, the outer barrel outboard bearing 614 supports the outer barrel 204 to the housing 612. Alternatively or additionally, the outer barrel outboard bearing 614 can support the outer barrel 204 to the can 616. In this implementation, the inner barrel outboard bearing 630 supports the inner barrel 622 to the can 616. In some implementations, a thrust bearing 632 can be included to axially support the inner barrel 622 to the can 616. In some implementations, a thrust bearing can be included to axially support the outer barrel 604. As illustrated, the outer bearing assemblies 610 include magnetic bearings. Such bearings can include either active or passive bearings. The outer barrel outboard bearing 614 and the inner barrel outboard bearing 630 can include magnetic bearings or mechanical bearings. While this example is illustrated with magnetic bearings, mechanical bearings can also be used. In instances where a mechanical bearing is used, mechanical bearings can include ball bearings, fluid film bearings, or any other type of mechanical bearing. In instances where a magnetic bearing is used, the magnetic bearings can include passive magnetic bearings, active magnetic bearings, or any combination of magnetic bearings.

Figure 7:
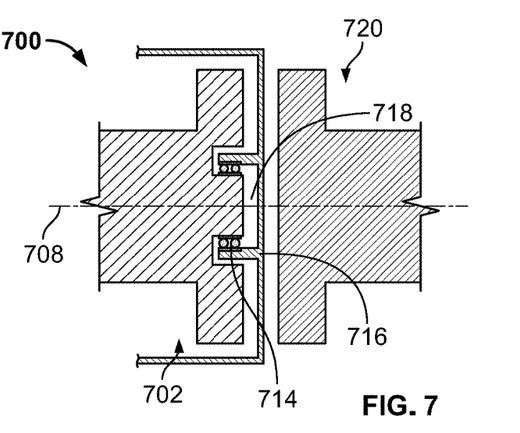
FIG. 7 is a side, half cross-sectional view of an example magnetic coupling.

FIG. 7 is a side cross-sectional view of an example magnetic coupling assembly 700 that can be used with aspects of this disclosure. In this example, the magnetic coupling 700 is an axial gap coupling rather than a radial gap coupling that has been previously described. A first barrel assembly 702 includes the first barrel outboard bearing 714 supported by the can 716. In such an implementation, the first barrel outboard bearing 714 is supported by a first recess 718 on a first side of the can 716. The first recess 718 is fluidically isolated from the second barrel assembly 720. The first recess 718 is configured to align with the first central longitudinal axis 708. In some implementations, the can 716 can include structural reinforcements around the first recess 718 to help structurally support the rotodynamic loads caused by the rotating coupling 700. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 8:
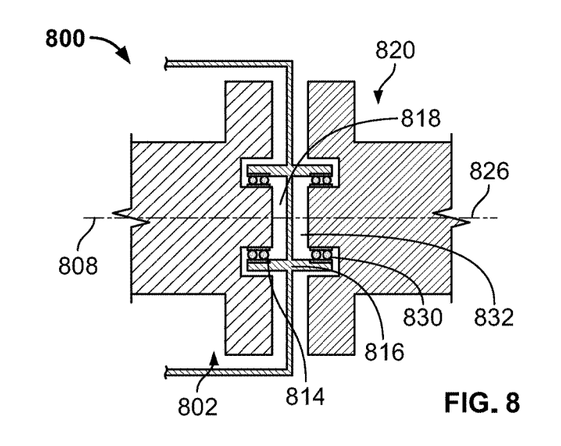
FIG. 8 is a side, half cross-sectional view of an example magnetic coupling.

FIG. 8 is a side cross-sectional view of an example magnetic coupling assembly 800 that can be used with aspects of this disclosure. In this example, the magnetic coupling 800 is an axial gap coupling rather than a radial gap coupling that has been previously described. In this example, both the first barrel assembly 802 and the first barrel assembly 820 include bearings, the first barrel outboard bearing 814 and the second barrel outboard bearing 830, supported by the can 816. In such an implementation, the first barrel outboard bearing 814 is supported by a first recess 818 on a first side of the can 816, while the second barrel outboard bearing 830 is supported by a second recess 832 on a second side of the can 816. The first recess 818 and the second recess 832 are fluidically isolated from one another. The first recess 818 is configured to align with the first central longitudinal axis 808. The second recess 832 is configured to align with the second central longitudinal axis 826. In some implementations, the can 816 can include structural reinforcements around the first recess 818 and/or the second recess 832 to help structurally support the rotodynamic loads caused by the rotating coupling 800. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 9:
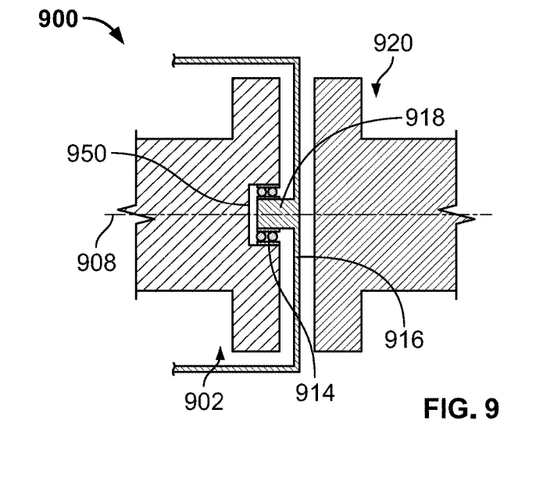
FIG. 9 is a side, half cross-sectional view of an example magnetic coupling.

FIG. 9 is a side cross-sectional view of an example magnetic coupling assembly 900 that can be used with aspects of this disclosure. In this example, the magnetic coupling 900 is an axial gap coupling rather than a radial gap coupling that has been previously described. A first barrel assembly 902 includes the first barrel outboard bearing 914 supported by the can 916. In such an implementation, the first barrel outboard bearing 914 is supported by a first protrusion 918 on a first side of the can 916. The outboard bearing is housed within a recess 950 of the barrel assembly 902. The recess 950 is fluidically isolated from the second barrel assembly 920. The protrusion 918 and the recess 950 are both configured to align with the first central longitudinal axis 908. In some implementations, the can 916 can include structural reinforcements around the first protrusion 918 to help structurally support the rotodynamic loads caused by the rotating coupling assembly 900. Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 10:
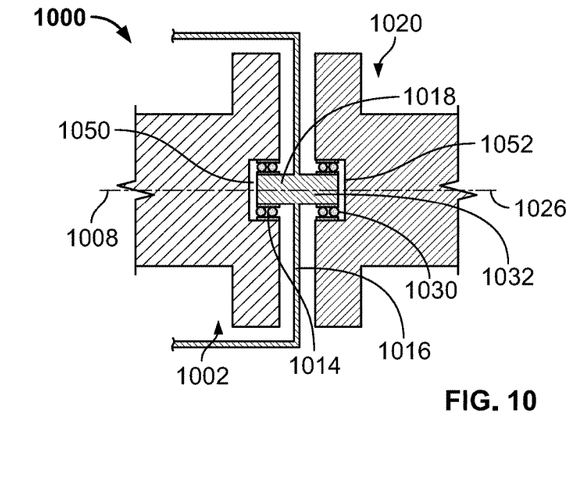
FIG. 10 is a side, half cross-sectional view of an example magnetic coupling.

FIG. 10 is a side cross-sectional view of an example magnetic coupling assembly 1000 that can be used with aspects of this disclosure. In this example, the magnetic coupling 1000 is an axial gap coupling rather than a radial gap coupling that has been previously described. In this example, both the first barrel assembly 1002 and the first barrel assembly 1020 include bearings, the first barrel outboard bearing 1014 and the second barrel outboard bearing 1030, supported by the can 1016. In such an implementation, the first barrel outboard bearing 1014 is supported by a first protrusion 1018 on a first side of the can 1016, while the second barrel outboard bearing 1030 is supported by a second protrusion 1032 on a second side of the can 1016. The first outboard bearing is housed within a recess 1050 of the first barrel assembly 1002 and the second outboard bearing is housed within a recess 1052 of the second barrel assembly 1020. The first recess 1050 and the second recess 1052 are fluidically isolated from one another. The first protrusion 1018 and the first recess 1050 are configured to align with the first central longitudinal axis 1008. The second protrusion 1032 and the second recess 1052 are configured to align with the second central longitudinal axis 1026. In some implementations, the can 1016 can include structural reinforcements around the first protrusion 1018 and/or the second protrusion 1032 to help structurally support the rotodynamic loads caused by the rotating coupling 1000 Structural supports can include ribs, thicker structural sections that are under stress, and large radii at shape transformations to distribute stresses. Materials typically used are austenitic stainless steels for their non-magnetic properties. For these cans use of high strength non-magnetic alloys such as Inconel and titanium can allow for thinner can sections as well as higher material resistivity for reduced eddy current losses. Non-metallic cans offer elimination of eddy current losses generated from the varying magnetic field of the coupling for higher efficiency and torque transmittal. Example materials for non-metallics include machinable ceramics, such as Macor, and carbon or glass reinforced Torlon or PEEK.

Figure 11:
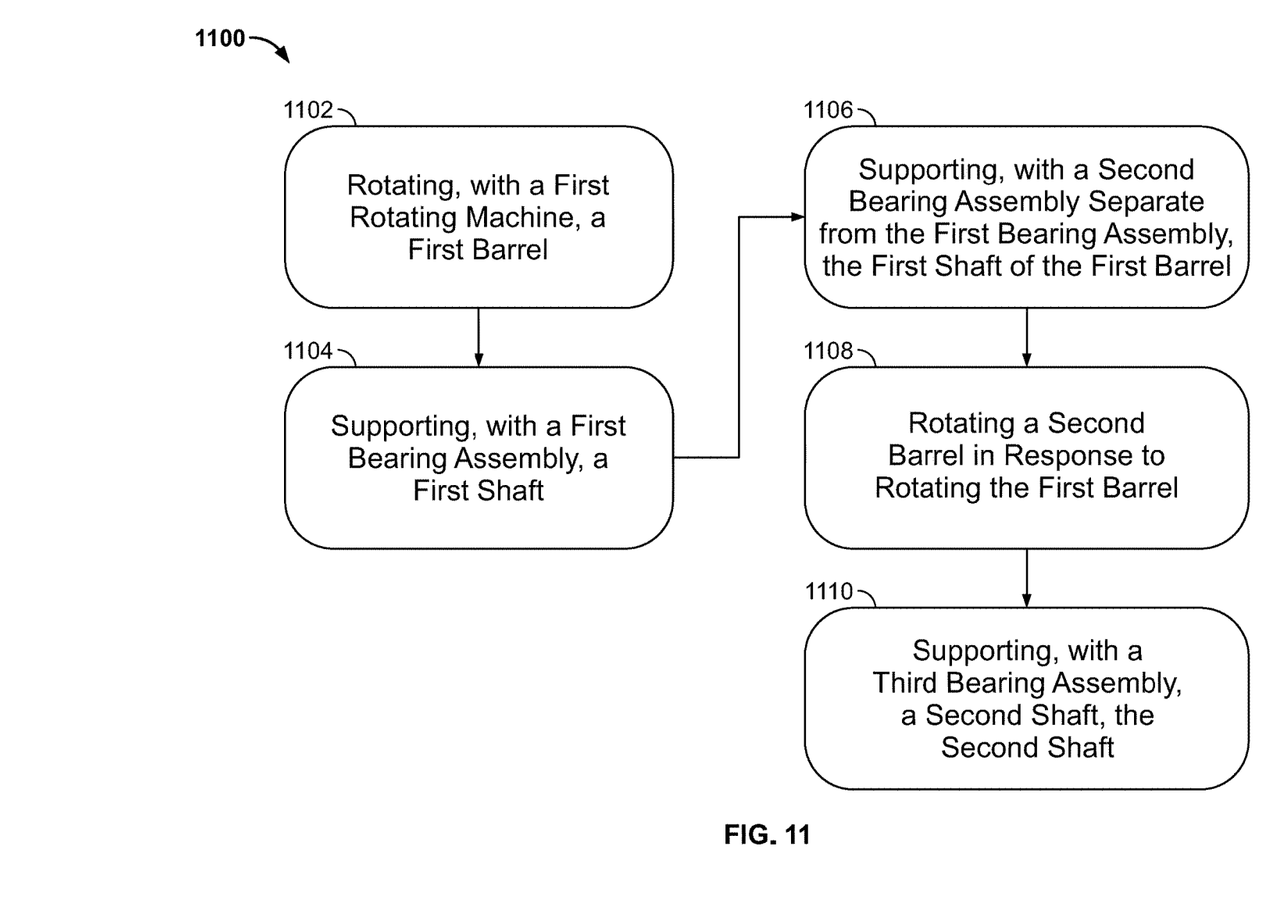
FIG. 11 is a flowchart of an example method that can be used with aspects of this disclosure.

FIG. 11 is a flowchart of an example method 1100 of transferring torque that can be used with aspects of this disclosure. At 1102, a first barrel is rotated with a first rotating machine. At 1104, a first shaft attached to the first barrel is supported with a first bearing assembly. The first bearing assembly is on a first side of the first barrel. The first shaft of the first barrel is supported with a second bearing assembly that is separate from the first bearing assembly. The second bearing assembly is on a second side of the first barrel opposite the first side of the first barrel. At 1106, the second bearing assembly is supported by an isolation can. At 1108, a second barrel is rotated in response to rotating the first barrel. The second barrel is magnetically coupled to the first barrel. At 1110, a second shaft is supported with a third bearing assembly. The second shaft is attached to the second barrel. The third bearing assembly is separate from the first and second bearing assembly. The third bearing assembly is on a first side of the second barrel.

In some implementations, the second shaft is supported with a fourth bearing assembly. The fourth bearing assembly is separate from the first, second, and third bearing assemblies. The fourth bearing assembly is on a second side of the second barrel opposite the first side. The fourth bearing assembly is supported by the isolation can. A second rotating machine is rotated by the second barrel.

In some implementations, the second shaft is supported with a fourth bearing assembly. The fourth bearing assembly is separate from the first, second, and third bearing assemblies. The fourth bearing assembly is on a second side of the second barrel opposite the first side. The fourth bearing assembly is supported by a second isolation can that is separate from the first isolation can. A second rotating machine is rotated by the second barrel.

In some implementations, different bearings can be used in different places on the shaft. The bearings, while shown in one integrated arrangement on the can, can be integrated in other ways that result in the same support system for the rotors.

While this disclosure contains many specific implementation details, these should not be construed as limitations on the scope of what may be claimed, but rather as descriptions of features specific to particular implementations. For example, the bearings in any of the described implementations can include magnetic or mechanical bearings. In this context, a mechanical bearing can include a fluid film bearing or an anti-friction bearing, such as a ball bearing. In instances where a magnetic bearing is used, the magnetic bearing can include a passive magnetic bearing and/or an active magnetic bearing.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A magnetic coupling assembly for a pump for moving process fluid, the magnetic coupling assembly comprising:
   an outer barrel assembly comprising:
      an outer barrel configured to rotate;
      a first central shaft that passes through a first central longitudinal axis of the outer barrel, the first central shaft configured to rotate with the outer barrel;
      a first bearing assembly attached to the first shaft on a first side of the outer barrel, the first bearing assembly rotatably supporting the first shaft on a housing; and
      a second bearing assembly attached to the first shaft on a second side of the outer barrel opposite the first side of the outer barrel, the second bearing assembly rotatably supporting the first shaft on an isolation can;
   an inner barrel assembly exposed to the process fluid, the inner barrel assembly comprising:
      an inner barrel magnetically coupled to the outer barrel, the inner barrel configured to rotate with the outer barrel;
      a second central shaft, separate from the first central shaft, that passes through a second central longitudinal axis of the inner barrel, the second central shaft configured to rotate with the inner barrel, wherein the first central axis and the second central axis are aligned;
      a third bearing assembly attached to the second shaft on a first side of the inner barrel, the third bearing assembly rotatably supporting the second shaft on the housing; and
   the isolation can fluidically isolates the inner barrel assembly from the outer barrel assembly, the isolation can supports the second bearing assembly on the housing.

2. The magnetic coupling assembly of claim 1, wherein the isolation can comprises:
   a surface defining a first recess configured to receive and support the second bearing assembly; and
   a surface defining a second recess separate and fluidically isolated from the first recess.

3. The magnetic coupling assembly of claim 2, wherein the inner barrel assembly further comprises:
   a fourth bearing assembly attached to the second shaft on a second side of the inner barrel opposite the first side of the inner barrel, the fourth bearing assembly rotatably supporting the second shaft on the isolation can, the second recess configured to receive and support the fourth bearing assembly.

4. The magnetic coupling assembly of claim 3, wherein the fourth bearing assembly comprises a ball bearing.

5. The magnetic coupling assembly of claim 1, wherein the isolation can is a first isolation can, the magnetic coupling assembly further comprising:
   a second isolation can configured to be received by the first isolation can, the second isolation can configured to fluidically isolate the inner barrel assembly from an outside environment.

6. The magnetic coupling assembly of claim 5, wherein the inner barrel assembly further comprises:
   a fourth bearing assembly attached to a second end of the second shaft, the fourth bearing assembly rotatably supporting the second shaft on the second isolation can.

7. The magnetic coupling assembly of claim 1, wherein the outer barrel comprises permanent magnets configured to magnetically couple the outer barrel to the inner barrel.

8. The magnetic coupling assembly of claim 1, wherein the inner barrel comprises permanent magnets configured to magnetically couple the inner barrel to the outer barrel.

9. The magnetic coupling assembly of claim 1, wherein the first bearing assembly, the second bearing assembly, or the third bearing assembly comprises magnetic bearings.

10. The magnetic coupling assembly of claim 1, wherein the second bearing assembly comprises a ball bearing.

11. A method of transferring torque in a system for moving process fluid, comprising:
   rotating, with a first rotating machine, a first barrel exposed to the process fluid;
   rotatably supporting, with a first bearing assembly a first shaft, the first shaft attached to the first barrel, the first bearing assembly being on a first side of the first barrel;
   rotatably supporting, with a second bearing assembly separate from the first bearing assembly, the first shaft of the first barrel, the second bearing assembly being on a second side of the first barrel opposite the first side of the first barrel, the second bearing assembly supported by an isolation can;
   rotating a second barrel in response to rotating the first barrel, the second barrel being magnetically coupled to the first barrel; and
   rotatably supporting, with a third bearing assembly, a second shaft, the second shaft attached to the second barrel, the third bearing assembly being separate from the first and second bearing assemblies, the third bearing assembly being on a first side of the second barrel.

12. The method of claim 11, further comprising:
   rotatably supporting, with a fourth bearing assembly, the second shaft, the fourth bearing assembly being separate from the first bearing assembly, the second bearing assembly, and third bearing assembly, the fourth bearing assembly being on a second side of the second barrel opposite the first side, the fourth bearing assembly being supported by the isolation can; and
   rotating, by the second barrel, a second rotating machine.

13. The method of claim 11, wherein the isolation can is a first isolation can, the method further comprising:
   rotatably supporting, with a fourth bearing assembly, the second shaft, the fourth bearing assembly being separate from the first bearing assembly, the second bearing assembly, and third bearing assembly, the fourth bearing assembly being on a second side of the second barrel opposite the first side, the fourth bearing assembly being supported by a second isolation can; and
   rotating, by the second barrel, a second rotating machine.

14. The method of claim 13, wherein the second rotating machine comprises a pump, a compressor, or an electric generator.

15. The method of claim 13, wherein rotating the first machine and rotating the second machine comprise rotating both the first machine and the second machine at 10,000 rotations per minute.

16. The method of claim 13, wherein rotating the first machine and rotating the second machine comprise rotating both the first machine and the second machine at 120,000 rotations per minute.

17. The method of claim 11, further comprising fluidically isolating the first barrel from the second barrel with the isolation can.

18. The method of claim 11, wherein the first rotating machine comprises an electric motor or a turbine.

19. The method of claim 11, wherein rotatably supporting the first barrel with a first bearing assembly comprises magnetically supporting the first barrel.

20. The method of claim 19, wherein magnetically supporting the first barrel comprises using permanent magnets to generate a magnetic field.

21. The method of claim 11, wherein rotatably supporting the second barrel with a second bearing assembly comprises magnetically supporting the second barrel.

22. The method of claim 11, wherein permanent magnets mounted on the first barrel or the second barrel magnetically couple the first barrel and second barrel to one another.

23. A magnetic coupling assembly comprising:
an outer barrel assembly comprising:
an outer barrel configured to rotate;
a first central shaft that passes through a first central longitudinal axis of the outer barrel, the first central shaft configured to rotate with the outer barrel;
a first bearing assembly attached to the first shaft on a first side of the outer barrel, the first bearing assembly rotatably supporting the first shaft on a housing; and
a second bearing assembly attached to the first shaft on a second side of the barrel opposite the first side of the barrel, the second bearing assembly rotatably supporting the first shaft on an isolation can;
an inner barrel assembly comprising:
an inner barrel magnetically coupled to the outer barrel, the inner barrel being exposed to an outside environment, the inner barrel configured to rotate with the outer barrel;
a second central shaft, separate from the first central shaft, that passes through a second central longitudinal axis of the inner barrel, the second central shaft configured to rotate with the inner barrel, wherein the first central axis and the second central axis are aligned;
a third bearing assembly attached to the second shaft on a first side of the inner barrel, the third bearing assembly rotatably supporting the second shaft on the housing;
a fourth bearing assembly attached to the second shaft on a second side of the second barrel opposite the first side of the second barrel, the second bearing assembly rotatably supporting the second shaft on the isolation can; and
the isolation can fluidically isolates the inner barrel assembly from the outer barrel assembly, the isolation can supporting the second bearing assembly to the housing, the isolation can supporting the fourth bearing assembly to the housing.

24. The magnetic coupling assembly of claim 23, wherein the inner barrel assembly, outer barrel assembly, and isolation can are configured to operate within a wellbore.

25. The magnetic coupling assembly of claim 23, wherein the inner barrel comprises permanent magnets configured to magnetically couple the inner barrel to the outer barrel.

26. The magnetic coupling assembly of claim 23, wherein the outer barrel comprises permanent magnets configured to magnetically couple the outer barrel to the inner barrel.

27. The magnetic coupling assembly of claim 23, wherein the third bearing assembly or the fourth bearing assembly comprises magnetic bearings.

28. The magnetic coupling assembly of claim 23, wherein the first bearing assembly or the second bearing assembly comprises magnetic bearings.

29. The magnetic coupling assembly of claim 23, wherein the isolation can comprises:
a surface defining first recess configured to receive and support the second bearing assembly; and
a surface defining second recess separate and fluidically isolated from the first recess, the second recess configured to receive and support the fourth bearing assembly.

* * * * *

UNITED STATES PATENT AND TRADEMARK OFFICE
CERTIFICATE OF CORRECTION

PATENT NO. : 10,428,822 B1
APPLICATION NO. : 15/965716
DATED : October 1, 2019
INVENTOR(S) : Zhiyang Wang, Patrick McMullen and David Biddick

Page 1 of 1

It is certified that error appears in the above-identified patent and that said Letters Patent is hereby corrected as shown below:

On the Title Page

Column 1 Item (73) (Assignee), delete "Energym" and insert -- Energy, --.

Signed and Sealed this
Thirty-first Day of March, 2020

Andrei Iancu
*Director of the United States Patent and Trademark Office*